United States Patent [19]

Grey et al.

[11] Patent Number: 5,895,121
[45] Date of Patent: Apr. 20, 1999

[54] EDITING APPARATUS AND EDITING METHOD

[75] Inventors: Christopher Grey; Yukihide Higuchi, both of Tokyo; Sojiro Kizu, Kanagawa, all of Japan

[73] Assignee: Sony Corporation, Tokyo, Japan

[21] Appl. No.: 08/803,596

[22] Filed: Feb. 21, 1997

[30] Foreign Application Priority Data

Feb. 22, 1996 [JP] Japan ................................ 8-035138

[51] Int. Cl.$^6$ .................................................. H04N 5/93
[52] U.S. Cl. .................................... 386/52; 386/64
[58] Field of Search ................................ 386/52, 64, 55, 386/125, 126, 53, 46, 4, 94; 360/13, 15; H04N 5/93

[56] References Cited

U.S. PATENT DOCUMENTS

| | | | |
|---|---|---|---|
| 5,126,851 | 6/1992 | Yoshimura et al. | 386/52 |
| 5,621,536 | 4/1997 | Kizu | 386/52 |

FOREIGN PATENT DOCUMENTS 2 286 282  8/1995  United Kingdom .

OTHER PUBLICATIONS

Patent Abstracts of Japan, vol. 007, No. 134 (P–203), Jun. 1, 1983 of JP 58 050684A (Matsushita Denki Sangyo KK), Mar. 25, 1983, *abstract*.

Patent Abstracts of Japan, vol. 018, No. 564 (P–1819), Oct. 27, 1994 of JP 06 203533 A (Sony Corp), Jul. 22, 1994, *abstract*.

*Primary Examiner*—Robert Chevalier
*Attorney, Agent, or Firm*—Frommer Lawrence & Haug, LLP.; William S. Frommer

[57] ABSTRACT

An editing apparatus is disclosed. This editing apparatus reproduces a video signal recorded in a tape-like recording medium and repetitively records the video signal on a predetermined repetitive recording area of a disk-like recording medium until a recording starting point is designated. Then, when the recording starting point is designated, the video signal is sequentially recorded on a predetermined normal recording area of the disk-like recording medium when the recording starting point is designated. When a recording ending point is designated, the video signal is recorded on the normal recording area during a predetermined period, whereafter the video signal is repetitively recorded on a second predetermined repetitive recording area of the disk-like recording medium.

5 Claims, 6 Drawing Sheets

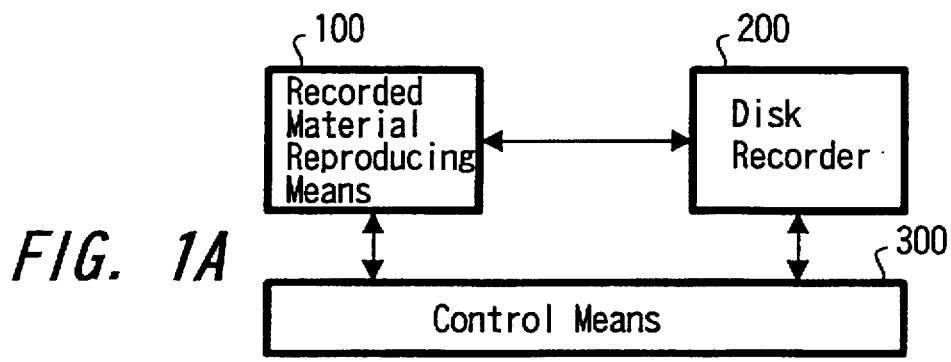
FIG. 1A
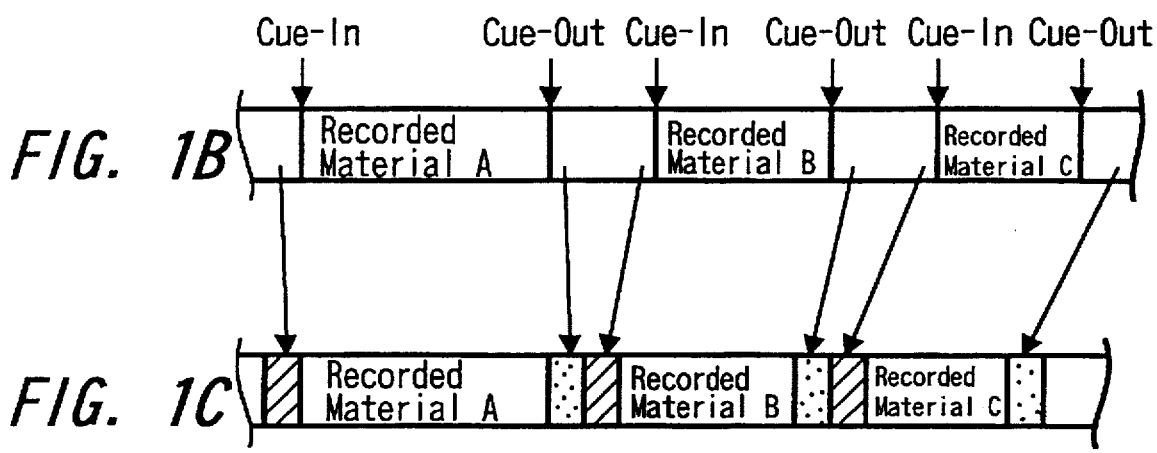
FIG. 1B
FIG. 1C

EDITING APPARATUS AND EDITING METHOD

BACKGROUND OF THE INVENTION

The present invention relates to editing apparatus and editing method using a disk-like recording medium.

Recently, there has been used an editing method in which a video signal recorded on a magnetic tape or the like is temporarily recorded on a hard disk and only a video signal located within a desired interval is reproduced from the video signal recorded on the hard disk, whereafter the reproduced signal is processed in a variety of fashions. The reason for this is that access speed of the hard disk is remarkably higher than that of the magnetic tape.

By the way, the hard disk has a high access speed but its storage capacity is very smaller than that of the magnetic tape. Therefore, in an editing method using a hard disk, it is preferable that only a video signal used in the edition is recorded so as to effectively use the hard disk small in the storage capacity. However, it is difficult for an operator that a video signal reproduced from the magnetic tape is monitored on the picture screen of a television monitor, a head position and an end position of an interval desired to be used are positively designated by a key input and then it is recorded on the hard disk. Also, this work is difficult due to the function of equipments.

OBJECT AND SUMMARY OF THE INVENTION

It is therefore an object of the present invention to provide editing apparatus and editing method in which a storage capacity of a disk-like recording medium can be used effectively and in which a video signal necessary for editing can be reliably transferred from a tape-like recording medium to a disk-like recording medium.

An editing apparatus which attains a main object of the present invention comprises reproducing means for reproducing a video signal recorded in a tape-like recording medium, recording means for recording a reproduced video signal in a disk-like recording medium, input means for designating a recording starting pointing and a recording ending point; and control means for controlling an operation of the recording means based on an output signal from the input means, in which the control means controls the recording means such that the video signal reproduced by the reproducing means is repeatedly recorded on a predetermined repetitive recording area of the disk-like recording medium until data indicative of the recording starting position is supplied thereto through the input means after start of operation, the control means controls the recording means such that the video signal reproduced by the reproducing means is sequentially recorded on a predetermined normal recording area of the disk-like recording medium when data indicative of the recording starting point is supplied thereto through the input means, and the control means controls the recording means such that the video signal reproduced by the reproducing means is repeatedly recorded on a second predetermined repetitive recording area of the disk-like recording medium when data indicative of the recording ending point is supplied thereto through the input means.

An editing method which attains a main object of the present invention comprises steps of reproducing a video signal stored a tape-like recording medium, designating a recording starting point; repeatedly recording the video signal on a predetermined repetitive recording area of a disk-like recording medium until the recording starting point is designated, sequentially recording the video signal on a predetermined normal recording area of the disk-like recording medium when the recording starting point is designated, and recording the video signal on the normal recording area during a predetermined period when a recording ending point is designated, and then repetitively recording the video signal on a second predetermined repetitive recording area of the disk-like recording medium.

BRIEF DESCRIPTION OF THE DRAWINGS

FIGS. 1A through 1C are explanatory diagrams showing a concept of editing apparatus according to the present invention;

DETAILED DESCRIPTION OF THE PREFERRED EMBODIMENTS

Figure 2:
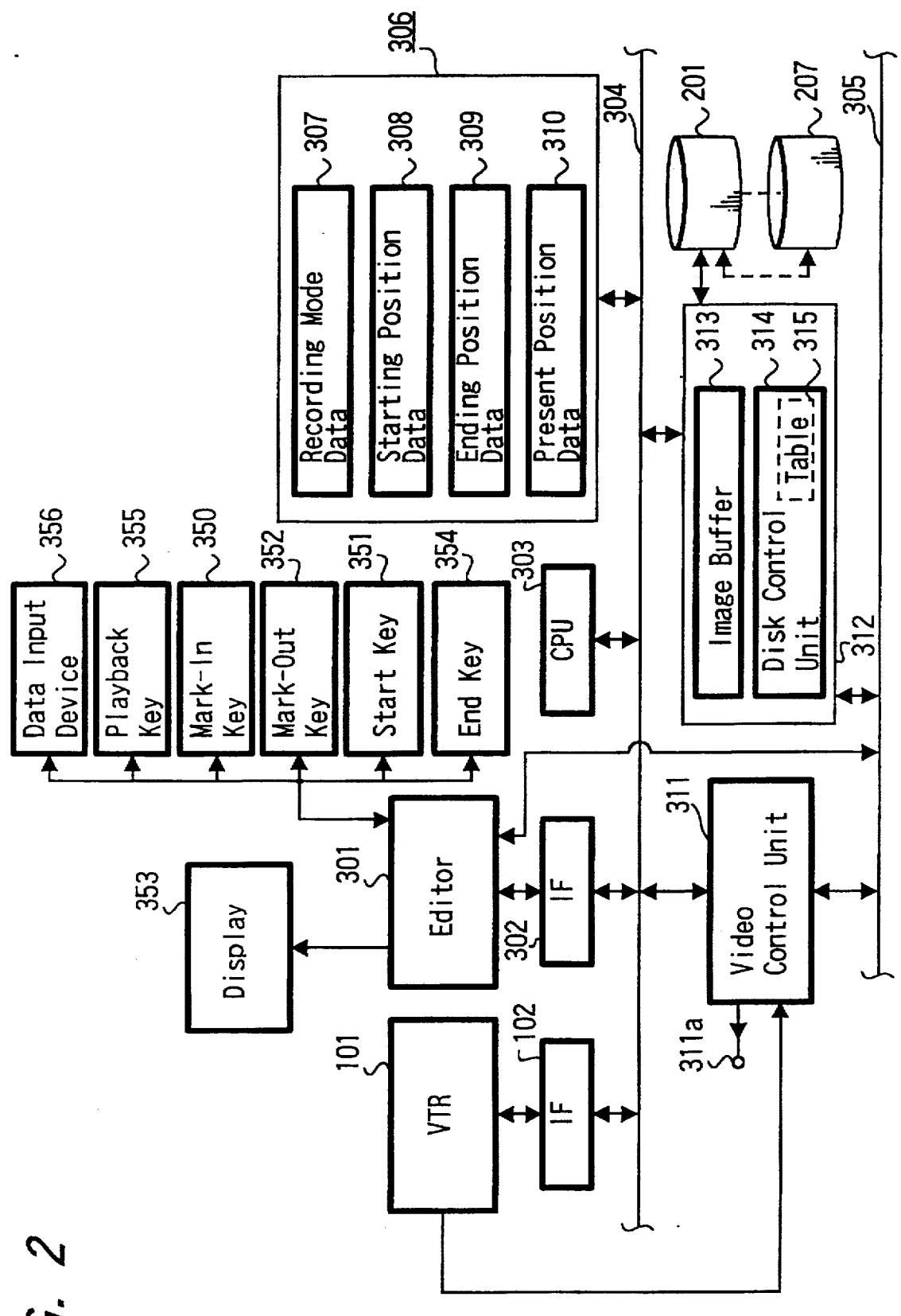
FIG. 2 is a block diagram showing an editing apparatus according to an embodiment of the present invention.

The present invention will now be described in detail below with reference to FIGS. 1A through 6.

FIGS. 1A through 1C are diagrams used to explain a concept of an editing apparatus according to the present invention.

As shown in FIG. 1A, the editing apparatus includes a material reproducing means 100, a disk recorder 200 and a control means 300. A material that is reproduced by the material reproducing means 100 is recorded on the disk recorder 200.

The manner in which the material reproduced by the material reproducing means 100 is recorded on the disk recorder 200 will be described with reference to FIGS. 1B and 1C.

FIG. 1B shows the manner in which materials recorded on a recording medium such as a tape-like recording medium or the like are reproduced by the material reproducing means 100. As shown in FIG. 1B, when cue-ins and cue-outs are respectively designated, materials between respective pairs of the cue-in and the cue-out are provided as materials A, B, C. FIG. 1C conceptually shows the manner in which materials are recorded on recording areas of the disk recorder 200. In FIG. 1C, areas shown hatched illustrate repetitive recording areas, and areas shown dots illustrate extra recording areas, respectively.

As shown in FIG. 1A, materials are incessantly reproduced by the material reproducing means 100. Reproduced materials are repeatedly recorded in the disk recording areas at its repetitive recording areas until a cue-in is designated. Sectors 1 to 5 are recording areas and reproduced materials are recorded in the sectors 1, 2, . . . , 5, in that order. After reproduced material has been recorded in the sector 5, reproduced materials are recorded one more time in the sequential order of the sectors 1, 2, . . . , 5. During reproduced materials are repeatedly recorded in the repetitive recording areas, if a cue-in is designated, then a seek operation is started immediately and reproduced materials are sequentially recorded in the next areas of the repetitive recording areas. At that time, the above-mentioned repetitive recording is not carried out and the ordinary recording is carried out.

Subsequently, when a cue-out is designated, the repetitive recording area of the same duration of time is set from a recording area obtained at the time a predetermined time is passed from the cue-out. Reproduced materials are repetitively recorded in the repetitive recording areas. When the "predetermined time" has passed, as shown by dots in FIG. 1C, the extra recording areas are formed. When the above-mentioned processing is carried out repeatedly, materials A, B, C each of which has extra portions attached to the starting and ending portions, are recorded on the recording areas of the disk.

Hence, necessary materials can be recorded on the disk reliably and the small storage capacity can be used effectively. The present invention will be described below more fully with reference to FIG. 2 and the following sheets of drawings.

FIG. 2 is a block diagram showing an editing system according to an embodiment of the present invention.

In the editing system shown in FIG. 2, a CPU (central processing unit) bus 304 is connected to a CPU 303, and a VCR (video cassette recorder) 101 is connected to the CPU bus 304 through an interface (IF) circuit 102. An editor 301 is connected through an interface circuit 302 to the bus 304 to which a RAM (random-access memory) 306, a video control unit 311 and a disk recorder control unit 312 are also connected. Hard disk drives 201 through 207 are connected to the disk recorder control unit 312 in a daisy chain fashion, and a video control unit 311 and the disk recorder control unit 312 are connected to a data bus 305.

The RAM 306 stores therein recording mode data 307, starting position data 308, ending position data 309 and present position data 310 which will be described later on. The disk recorder control unit 312 comprises an image buffer 313 serving as a buffer for data to be stored on or data reproduced from the disk drives 201 through 207 and a disk control unit 315. A storage capacity of the image buffer 313 is selected to be sufficient so that at least reproduced video data, which are incessantly supplied from the VCR 101, can be all recorded in the disk drives 201 through 207.

Figures 3A, 3B, 3C, 3D, 3E:
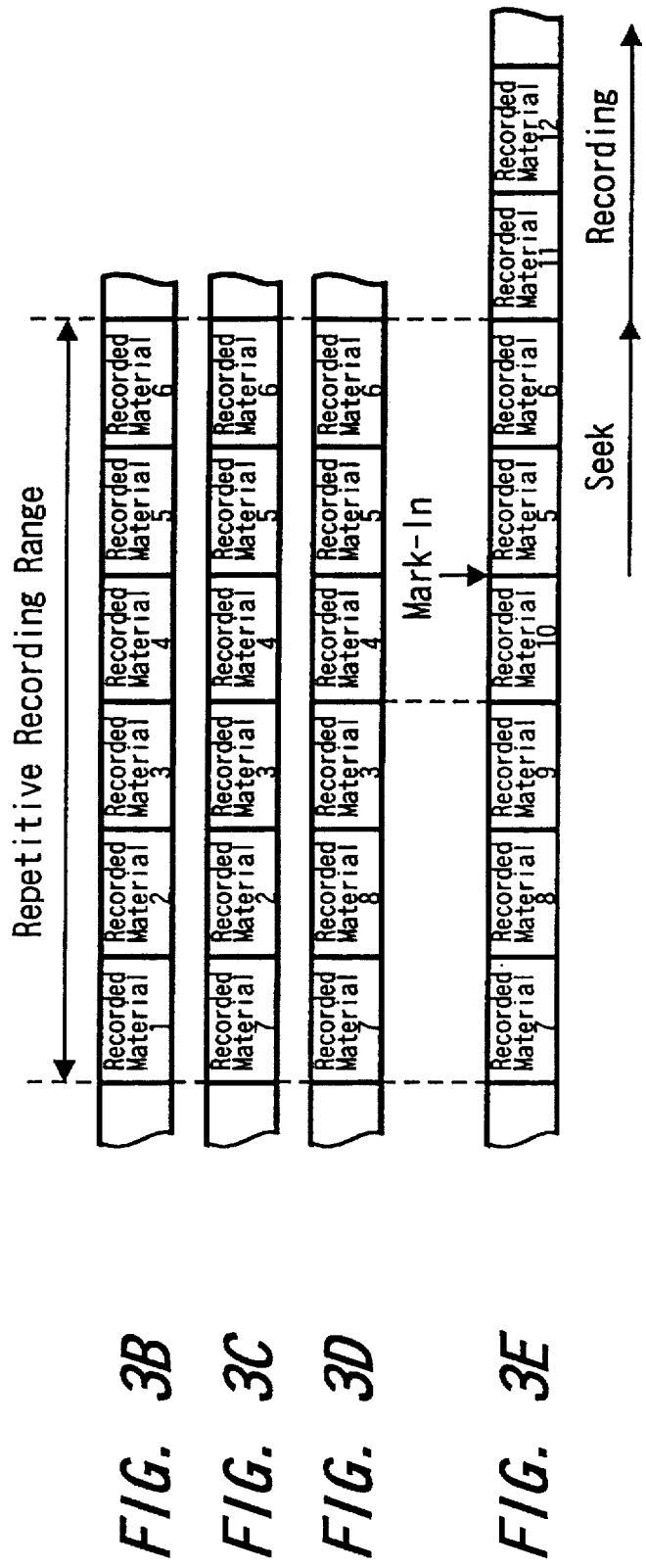
FIG. 3A is a schematic diagram showing an editing table used in the editing apparatus shown in FIG. 2.
FIGS. 3B through 3E are schematic diagrams used to explain an operation of the editing apparatus shown in FIG. 2.

The disk control unit 314 includes a table 315 to control the disk drives 201 through 207. The table 315 will be described below with reference to FIG. 3A. As shown in FIG. 3A, the table 315 comprises block number data, logical address data and disk ID (identification) data. The block number data is given to each of video data of one frame upon recording. The logical address data comprises track number data, logical sector number data and data length data. The disk ID data is each ID of the hard disk drives 201 through 207. The present position data 310 shown in FIG. 2 corresponds to logical address data.

The logical sector number data corresponds to a starting sector number of all sectors corresponding to the data amount of video data of one frame. Video data is data of frame unit and recorded in the sector unit. One frame generally comprises N sectors so that block number data corresponding to each frame is registered in the table 315 in correspondence with starting logical sector number data of sectors of each frame. Thus, when block number data is supplied from the CPU 303, the disk control unit 314 supplies logical address data, which is registered in correspondence with that block number data, to the hard disk drives 201 through 207. When supplied with the logical address data, the hard disk drive 201 converts the thus supplied logical address data into physical address data, and reads out video data from the recording area indicated by the physical address data by an amount shown by data length data.

Data length data always becomes a constant value because the minimum unit of recording and playback is one frame. The contents of the table 315 are rewritten in the same manner as the manner in which video data reproduced from the VCR 101 is recorded in the hard disk drives 201 through 207. Specifically, within the range of logical address data corresponding to the repetitive recording area, block number data generated from the CPU 303 are rewritten cyclically. Then, when a mark-in key 350 is depressed, block number data and logical address data are sequentially written in the next storage area of the range of the logical address corresponding to the repetitive recording area. Logical address data may, of course, be loaded into the RAM 306 from a ROM (read-only memory) or the like, not shown, and only block number data may be rewritten.

Figure 4:
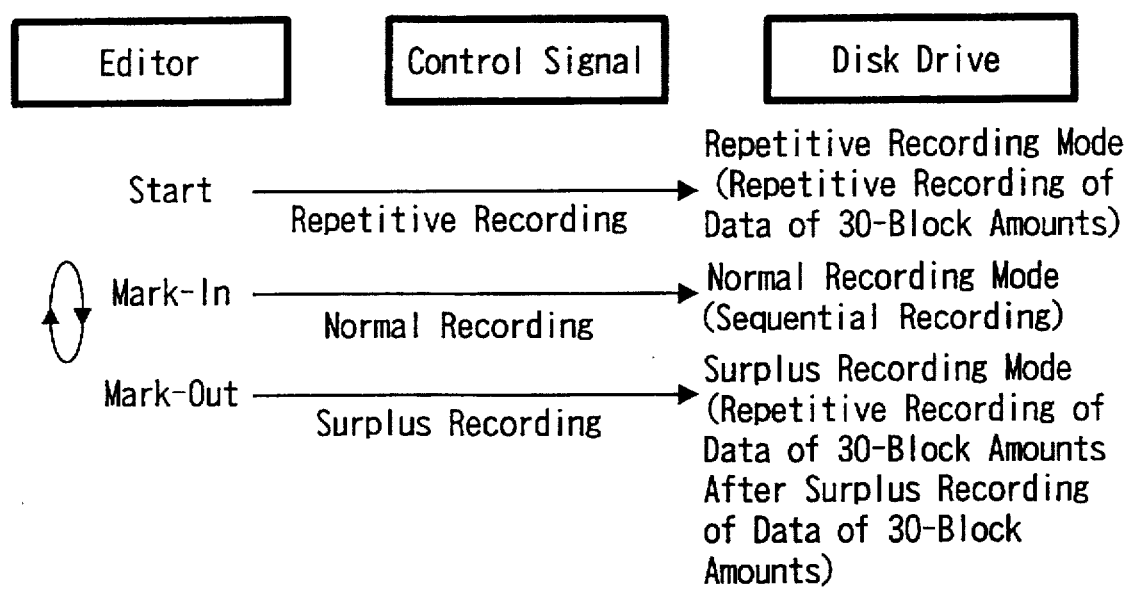
FIG. 4 is a schematic diagram used to explain an operation of the editing apparatus shown in FIG. 2.

The recording sequence will be described with reference to FIG. 4. If a start key 351 of the editor 301 shown in FIG. 2 is depressed, then the editor 301 supplies a control signal indicative of the repetitive recording to be carried out to the CPU 303. Thus, the CPU 303 places the disk control unit 314 in the repetitive recording mode. The disk control unit 314 controls the hard disk drives 201 through 207 in such a manner that reproduced video data supplied from the VCR 101 through the video control unit 311 are repetitively recorded in recording areas of 30 blocks of the hard disk drives 201 through 207. Watching reproduced video data displayed on a display 353 after it has been supplied to the editor 301 from the video control unit 311 through the data bus 305, the operator determines the cue-in and the cue-out of the reproduced video data.

If the operator depresses the mark-in key 350 of the editor 301 shown in FIG. 2 at the arrival of a desired cue-in, then the editor 301 supplies a control signal indicative of the normal recording to be carried out to the CPU 303 so that the CPU 303 places the disk control unit 314 in the normal recording mode. Then, the disk control unit 314 controls the hard disk drives 201 through 207 in such a fashion that reproduced video data supplied from the VCR 101 through the video control unit 311 is successively recorded in the next area of recording areas of 30 blocks of the hard disk drives 201 through 207. The mark-in key 350 is used to designate a cue-in.

Subsequently, if the operator depresses a mark-out key 352 of the editor 301 shown in FIG. 2 at the arrival of a desired cue-out, then the editor 301 supplies a control signal indicative of the repetitive recording to be carried out with a delay of 30 blocks, for example, to the CPU 303 so that the CPU 303 sets the disk control unit 314 in the extra recording mode. In the extra recording mode, after depression of the mark-out key 352, video data of 30 blocks are recorded in surplus and then the disk control unit 314 goes to the repetitive recording mode. The disk control unit 314 controls the hard disk drives 201 through 207 in such a manner that reproduced video data supplied from the VCR 101 through the video control unit 311 are recorded on the recording areas of 30 blocks of the hard disk drives 201 through 207. The mark-out key 352 is used to designate cue-out.

After the recording of video data on the recording areas of 30 block has been finished, the disk control unit 314 is placed again in the repetitive recording mode. Therefore, if the above-mentioned processing is repeated, materials will be sequentially recorded in the hard disk drives 201 through 207.

FIGS. 3B through 3E are diagrams showing the repetitive recording more clearly. In the repetitive recording, materials 1, 2, 3, ..., 6 are sequentially recorded in the repetitive recording areas of the hard disk drives 201 through 207 in the order in which the materials 1, 2, 3, ..., 6 are supplied. If materials up to the material 6 are recorded, then the next material 7 is recorded again in the starting portion of the repetitive recording area as shown in FIG. 3C. Then, as shown in FIG. 3D, the next material 8 is recorded during the next cycle. If the above-mentioned processing is repeated, then materials 7, 8, 9 and 10 are recorded as shown in FIG. 3E.

In this state, if the operator depresses the mark-in key 350, then under control of the disk control unit 314, areas of the hard disk drives 201 through 207 in which the materials 4 and 6 are recorded are extracted by the seek operation and the next recording area of the repetitive recording area is accessed. The repetitive recording mode for the repetitive recording area will be released from now on. Then, materials 11, 12 supplied after the material 10 are sequentially recorded.

The manner in which materials recorded on the hard disk drives 201 through 207 are reproduced will be described below. Specifically, reproduced video data are temporarily written in the image buffer 313, then read out therefrom and supplied through the data bus 305 to the video control unit 311, whereafter it is converted into a video signal and then outputted from an output terminal 311a. Moreover, the reproduced video data is supplied through the data bus 305 to the editor 301 and then displayed by the display 353.

The manner in which the editing system shown in FIG. 2 is operated upon recording will be described with reference to FIGS. 5 and 6.

Figure 5:
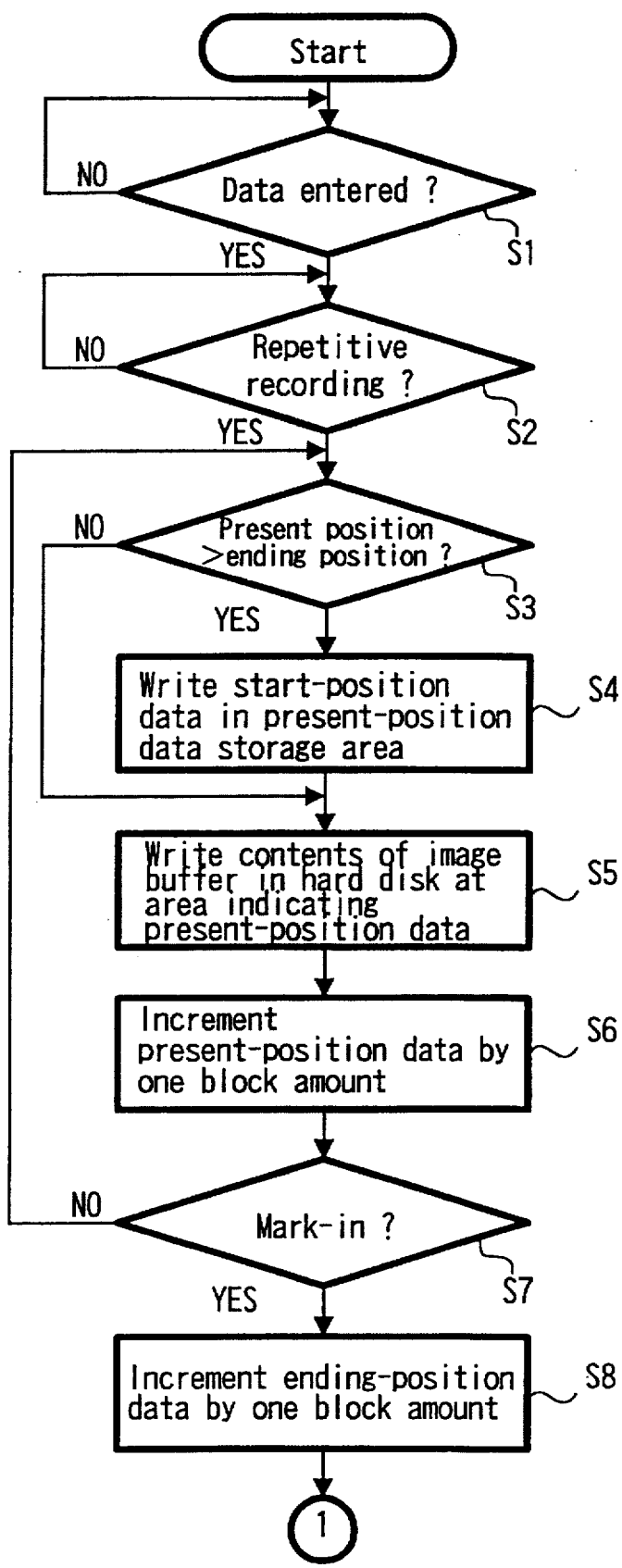
FIGS. 5 and 6 are flowcharts to which reference will be made in explaining an operation of the editing apparatus shown in FIG. 2.

Referring to FIG. 5, following the start of operation, it is determined at a decision step S1 by the CPU 303 shown in FIG. 2 whether or not data is entered by operation keys of the editor 301. If a YES is outputted at the decision step S1, then control goes to the next decision step S2. In the decision step S2, it is determined by the CPU 303 shown in FIG. 2 whether or not the-start key 351 of the editor 301 is depressed. If a YES is outputted at the decision step S2, then it is determined that the repetitive recording is instructed. Then, control goes to the next decision step S3. When the start key 351 is depressed, data indicating the repetitive recording to be carried out is stored in the RAM 306 as the recording mode data 307. It is determined by the CPU 303 by reading the recording mode data 307 whether or not the recording mode is the repetitive recording mode.

As a consequence, the CPU 303 shown in FIG. 2 supplies a playback start command to the video control unit 311. The video control unit 311 supplies a playback start command to the VCR 101 through the interface circuit 102. Reproduced video data from the VCR 101 is sequentially written in the image buffer 313 of the disk recorder control unit 312 through the video control unit 311 and the data bus 305.

In the decision step S3, it is determined by the CPU 303 shown in FIG. 2 whether or not present position data is larger than ending position data. If a YES is outputted at the decision step S3, then control goes to a step S4. If a NO is outputted at the decision step S3, then control goes to a step S5. When a power switch of the editing system is turned on, under control of the CPU 303, the starting position data 308 and the ending position data 309 are stored in the RAM 306 and starting logical address data is stored in the RAM 306 as the present position data 310. The ending position data 309 shows the position advanced from the starting position data 308 by 30 blocks.

In the step S4, the starting position data 308 is written in the storage area of the present position data 310 on the storage area of the RAM 306 under control of the CPU 303 shown in FIG. 2 because the position shown by the present position data 310 exceeds the position shown by the ending position data 309. In order to effect the repetitive recording, the starting position data 308 should be stored when the position shown by the present position data 310 reaches the position shown by the ending position data 309.

In the step S5, the CPU 303 shown in FIG. 2 reads out the present position data 310 stored in the RAM 306 and supplies the above present position data 310 to the disk recorder control unit 312. The disk control unit 314 of the disk recorder control unit 312 determines the hard disk drives 201 through 207 to which video data is transferred. The disk control unit 314 reads out physical address data corresponding to the present position data 310 supplied from the CPU 303 from the table 315.

Subsequently, the disk control unit 314 reads video data of one block from the image buffer 313, and transfers the video data of one block to the hard disk drives 201 through 207 together with the physical address data.

The video data of one block transferred to the hard disk drives 201 through 207 is recorded on the hard disk drives 201 through 207 at their recording areas shown by the physical address data. Further, the disk control unit 314 registers disk ID data indicative of the hard disk drives 201 to 207 to which the video data is transferred in the table 315.

In the next step S6, the CPU 303 shown in FIG. 2 increments the value of the present position data 310 stored in the RAM 306 by one block.

In the next decision step S7, it is determined by the CPU 303 whether or not the mark-in key 350 is depressed. If a YES is outputted at the decision step S7, then control goes to a step S8. If on the other hand a NO is outputted at the decision step S7, then control goes back to the decision step S3.

At the step S8, the CPU 303 shown in FIG. 2 increments the value of the ending position data 309 stored in the RAM 306 by one block.

Figure 6:
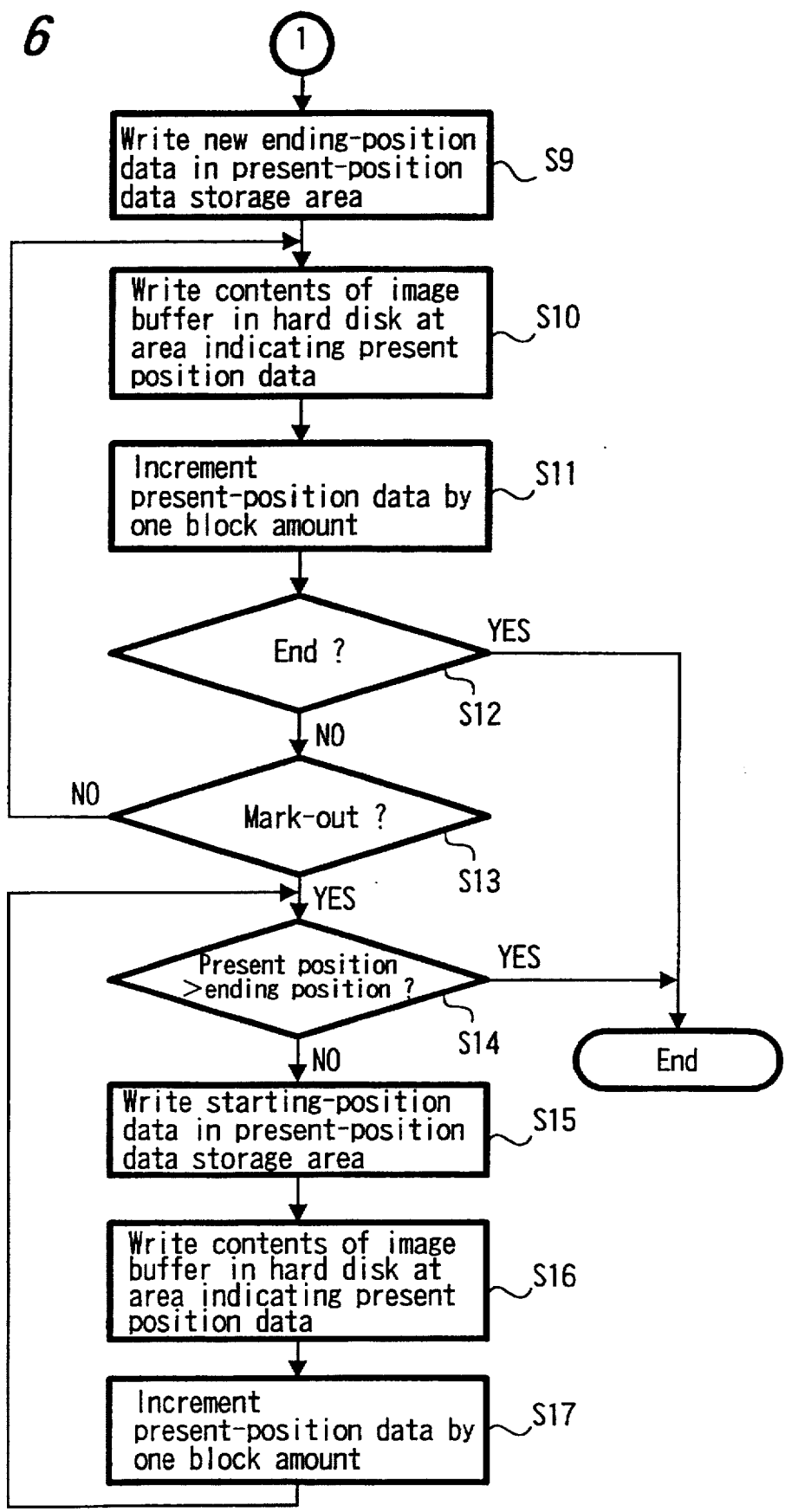

As shown in FIG. 6, in the next step S9, the CPU 303 shown in FIG. 2 writes the ending position data 309 stored in the RAM 306 in the RAM 306 at its storage area in which the present position data 310 is stored.

In the next step S10, the CPU 303 shown in FIG. 2 reads out the present position data 310 stored in the RAM 306, and supplies the above present position data 310 to the disk recorder control unit 312. The disk control unit 314 in the disk recorder control unit 312 determines the hard disk drives 201 through 207 to which video data is transferred. The disk control unit 314 reads out physical address data corresponding to the present position data 310 supplied from the CPU 303 from the table 315. Subsequently, the disk control unit 314 reads out video data of one block from the image buffer 313 and transfers the video data of one block to the hard disk drives 201 through 207 together with the physical address data.

The video data of one block transferred to the hard disk drives 201 through 207 is recorded in the hard disk drives 201 through 207 at their recording areas shown by the physical address data. Further, the disk control unit 314 registers disk ID data of the hard disk drives 201 through 207 to which the video data is transferred in the table 315.

In the next step S11, the CPU 303 shown in FIG. 2 increments the value of the present position data 310 stored in the RAM 306 by one block.

In the next decision step S12, it is determined by the CPU 303 shown in FIG. 2 whether or not the end key 354 of the editor 301 is depressed. If a YES is outputted at the decision step S12, control is ended. If on the other hand a NO is outputted, then control goes to the next decision step S13.

At the decision step S13, it is determined by the CPU 303 shown in FIG. 2 whether or not the mark-out key 352 of the editor 301 is depressed. If a YES is outputted at the decision step S13, then control goes to the next decision step S14. If on the other hand a NO is outputted at the decision step S13, then control goes back to the step S10.

In the decision step S14, it is determined by the CPU 303 shown in FIG. 2 whether or not the present position data is larger than the ending position data. If a YES is outputted at the decision step S14, then control is ended. If on the other hand a NO is outputted, then control goes to a step S15.

In the step S15, the CPU 303 shown in FIG. 2 writes the starting position data 308 in the RAM 306 at its storage area in which the present position data 310 is stored. The reason for this has already been described with reference to the step S4.

In the next step S16, the CPU 303 shown in FIG. 2 reads out the present position data 310 stored in the RAM 306, and supplied the above present position data 310 to the disk recorder control unit 312. The disk control unit 314 in the disk recorder control unit 312 determines the hard disk drives 201 through 207 to which video data is transferred. The disk control unit 314 reads out physical address data corresponding to the present position data 310 supplied from the CPU 303 from the table 315. Subsequently, the disk control unit 314 reads out the video data of one block from the image buffer 313 and transfers the above video data of one block to the hard disk drives 201 through 207 together with the physical address data.

The video data of one block transferred to the hard disk drives 201 to 207 is recorded in the hard disk drives at their recording areas shown by the physical address data. Further, the disk control unit 314 registers disk ID data of the hard disk drives 201 through 207 to which the video data was transferred in the table 315.

In the next step S17, the CPU 303 shown in FIG. 2 increments the value of the present position data 310 stored in the RAM 306 by one block. Then, control goes back to the decision step S14.

Upon reproduction, the editor 301 can vary the cue-in and cue-out by entering block number data through a data input device 356. In the editor 301, cue-in and cue-out are designated by block number data and a playback key 355 is depressed. With reference to the table 315 shown in FIG. 2, the CPU 303 sequentially supplies logical address data corresponding to block number data from the block number data of the designated cue-in to the block number data of the designated cue-out to the hard disk drives 201 through 207 and places the hard disk drives 201 through 207 in the reproducing mode. Therefore, video data ranging from the designated cue-in to the designated cue-out are reproduced from the hard disk drives 201 through 207. Thus, even when the operator depresses the mark-in key 350 and the mark-out key 352 at different timings, the operator can change desired cue-in and cue-out easily.

As described above, when the value shown by the present position data 310 is larger than that shown by the ending position data 309, the starting position data 308 is written in the RAM 306 at its storage area in which the present position data 310 is stored, and the present position data 310 is used as recording address for the hard disk drives 201 through 207. Thus, video data reproduced by the VCR 101 can be recorded in the disk drives 201 through 207 at their recording areas of predetermined 30 blocks in the repetitive recording mode.

If the mark-in key 350 is depressed during the repetitive recording is carried out, then the normal recording is started from the next area of the predetermined recording area of 30 blocks.

Then, if the mark-out key 352 is depressed, the repetitive recording is carried out again after a time period of 30 blocks was elapsed from that time point, i.e. after video data of 30 blocks has been recorded.

Therefore, the operator can set a desired position to the cue-in or cue-out reliably. Specifically, when the operator designates a cue-in and a cue-out in a manual fashion, it is unavoidable that the designated positions are delayed from desired cue-in and desired cue-out. However, video data are recorded in the recording area of 30 blocks from the position immediately-preceding the cue-in and the recording area of 30 blocks from the position immediately-succeeding the cue-out. Accordingly, even when the designated position is delayed from a desired cue-in or a desired cue-out, video data at that position are recorded in the above-mentioned recording areas. Thus, it is sufficient for the operator to advance or delay the positions of the cue-in and the cue-out in the later stage.

Furthermore, there is the large advantage that the storage capacities of the hard disk drives 201 through 2007 and the number of the hard disk drives 201 through 207 can be minimized.

As described above, reproduced materials are repeatedly recorded in the repetitive recording areas of the recordable areas of the disk recorder until the cue-in is designated. When the cue-in is designated, the reproduced materials are recorded in the normal recording areas of the disk recorder in the normal recording mode. After the cue-out is designated, the reproduced materials are repeatedly recorded in the above repetitive recording areas after a predetermined time has elapsed since cue-out was designated. Thus, the recording areas of the disk-like recording medium can be used effectively, and desired materials of the materials recorded in the tape-like recording medium can be reliably recorded in the disk-like recording medium.

Having described a preferred embodiment of the invention with reference to the accompanying drawings, it is to be understood that the present invention is not limited to that precise embodiment and that various changes and modifications could be effected therein by one skilled in the art without departing from the spirit or scope of the invention as defined in the appended claims.

What is claimed is:

1. An editing apparatus comprising:

reproducing means for reproducing a video signal recorded in a tape-like recording medium;

recording means for recording said reproduced video signal in a disk-like recording medium;

input means for designating a recording starting point and a recording ending point; and control means for controlling an operation of said recording means based on an output signal from said input means, in which said control means controls said recording means such that said video signal reproduced by said reproducing means is repeatedly recorded on a predetermined repetitive recording area of said disk-like recording medium until data indicative of said recording starting position is supplied thereto through said input means after start of operation, said control means controls said recording means such that said video signal reproduced by said reproducing means is sequentially recorded on a predetermined normal recording area of said disk-like recording medium when data indicative of said recording starting point is supplied thereto through said input means, and said control means controls said recording means such that said video signal reproduced by said reproducing means is repeatedly recorded on a second predetermined repetitive recording area of said disk-like recording medium when data indicative of said recording ending point is supplied thereto through said input means.

2. An editing apparatus according to claim 1, further comprising display means for displaying said video signal reproduced by said reproducing means.

3. An editing apparatus according to claim 1, further comprising second reproducing means for reproducing said video signal recorded on said disk-like recording medium by said recording means and second input means for designating a reproducing starting point and a reproducing ending point of said video signal that is to be reproduced from said disk-like recording medium, and wherein said control means controls said reproducing means such that said video signal located between said reproducing starting point and said reproducing ending point designated through said second input means is reproduced from said disk-like recording medium.

4. An editing apparatus according to claim 3, further comprising display means for displaying said video signal reproduced by said second reproducing means.

5. An editing method comprising the steps of:

reproducing a video signal stored in a tape-like recording medium;

designating a recording starting point;

repeatedly recording said video signal on a predetermined repetitive recording area of a disk-like recording medium until said recording starting point is designated;

sequentially recording said video signal on a predetermined normal recording area of said disk-like recording medium when said recording starting point is designated; and recording said video signal on said normal recording area during a predetermined period when a recording ending point is designated, and then repetitively recording said video signal on a second predetermined repetitive recording area of said disk-like recording medium.

* * * * *